United States Patent
Fujie (10) Patent No.: US 10,147,165 B2
(45) Date of Patent: Dec. 4, 2018

(54) DISPLAY DEVICE, CONTROL METHOD, PROGRAM AND RECORDING MEDIUM

(71) Applicant: PIONEER CORPORATION, Kanagawa (JP)

(72) Inventor: Tetsuya Fujie, Saitama (JP)

(73) Assignee: PIONEER CORPORATION, Kanagawa (JP)

( * ) Notice: Subject to any disclaimer, the term of this patent is extended or adjusted under 35 U.S.C. 154(b) by 0 days.

(21) Appl. No.: 15/121,145

(22) PCT Filed: Feb. 27, 2014

(86) PCT No.: PCT/JP2014/054857
§ 371 (c)(1),
(2) Date: Aug. 24, 2016

(87) PCT Pub. No.: WO2015/128985
PCT Pub. Date: Sep. 3, 2015

(65) Prior Publication Data
US 2016/0371813 A1    Dec. 22, 2016

(51) Int. Cl.
*G06T 3/40* (2006.01)
*B60W 50/14* (2012.01)
(Continued)

(52) U.S. Cl.
CPC ............ *G06T 3/40* (2013.01); *B60W 50/14* (2013.01); *G02B 27/01* (2013.01);
(Continued)

(58) Field of Classification Search
CPC ...... G06T 11/00; G06F 3/0488; G06F 9/4443; G06F 17/30041; G06F 17/30241;
(Continued)

(56) References Cited

U.S. PATENT DOCUMENTS 6,059,686 A * 5/2000 Takahashi ......... F16H 61/66259
477/118
2002/0162389 A1   11/2002 Yokota et al.
(Continued)

FOREIGN PATENT DOCUMENTS

JP    01-293239    11/1989
JP    06-247184    9/1994
(Continued)

OTHER PUBLICATIONS

International Search Report, PCT/JP2014/054857, dated May 13, 2014.

*Primary Examiner* — Sae Won Yoon
(74) *Attorney, Agent, or Firm* — Young & Thompson (57) ABSTRACT

A head-up display 2 includes a light source unit 4 and a combiner 9. A control unit 55 of the light source unit 4 displays on the combiner 9 a guide image indicating a letter or a graphic so that the guide image appears to overlap the background visible from a vehicle Ve. On the basis of a detection signal Sd sent from a vibration sensor 3 and the traveling speed of the vehicle Ve, the control unit 55 obtains a smoothness determination index α that is information on the degree of smoothness of the road surface on which the vehicle Ve is traveling. The control unit 55 changes the size of the letter or the graphic displayed on the combiner 9 in accordance with the smoothness determination index α.

11 Claims, 9 Drawing Sheets

(51) Int. Cl.
*G02B 27/01* (2006.01)
*G09G 5/26* (2006.01)

(52) U.S. Cl.
CPC . *B60W 2050/146* (2013.01); *G02B 2027/014* (2013.01); *G02B 2027/0141* (2013.01); *G09G 5/26* (2013.01); *G09G 2340/14* (2013.01)

(58) Field of Classification Search
CPC .. H04N 13/00; H04N 21/40; H04N 21/41422; G01C 21/00; G01C 21/10; G01C 21/20; G01C 21/26; G01C 21/36; G01C 21/3635; B60K 37/06; B60R 11/0258; B62D 6/006; H04W 4/04
USPC .......................................................... 345/632
See application file for complete search history.

(56) References Cited

U.S. PATENT DOCUMENTS

| | | | | |
|---|---|---|---|---|
| 2005/0085987 | A1* | 4/2005 | Yokota | B60C 23/0477 701/80 |
| 2009/0105921 | A1* | 4/2009 | Hanatsuka | B60G 17/0165 701/80 |
| 2009/0164073 | A1* | 6/2009 | Mabuchi | B60N 2/0232 701/49 |
| 2011/0126119 | A1* | 5/2011 | Young | G06F 3/048 715/744 |
| 2012/0235805 | A1* | 9/2012 | Nogami | G06T 7/215 340/441 |
| 2012/0268568 | A1* | 10/2012 | Li | G06F 3/013 348/47 |
| 2013/0027426 | A1* | 1/2013 | Sasaki | B60K 35/00 345/629 |
| 2014/0063064 | A1* | 3/2014 | Seo | G08G 1/166 345/633 |
| 2014/0317560 | A1* | 10/2014 | Hashimoto | G09B 29/007 715/788 |
| 2014/0331129 | A1* | 11/2014 | Saeki | G06F 3/016 715/702 |
| 2015/0211877 | A1* | 7/2015 | Laycock | G02B 3/14 701/444 |

FOREIGN PATENT DOCUMENTS

| | | |
|---|---|---|
| JP | 07-261727 | 10/1995 |
| JP | 2007-107956 | 4/2007 |
| JP | 2007-210462 | 8/2007 |
| JP | 2010066042 A | 3/2010 |
| JP | 2010-070066 | 4/2010 |
| JP | 2012-096731 | 5/2012 |
| JP | 2014-026177 | 2/2014 |
| WO | WO 01/98123 | 12/2001 |

* cited by examiner

| DETERMINATION LEVEL | Lv1: STANDARD | Lv2 | Lv3 | Lv4: ILL-PAVED |
|---|---|---|---|---|
| FONT SIZE | A | A | A | A |
| GRAPHIC SIZE | ↰ | ↰ | ↰ | ↰ |

LARGER AND THICKER →

DISPLAY DEVICE, CONTROL METHOD, PROGRAM AND RECORDING MEDIUM

TECHNICAL FIELD

The present invention relates to a display technology in consideration of the vibration of a vehicle.

BACKGROUND TECHNIQUE

Conventionally, regarding a head-up display, there is a technique of the reduction of an influence caused by the vibration of a vehicle. For example, Patent Reference-1 discloses ahead-up display which is equipped with a front camera and a driver camera for detecting the vibration of the vehicle and which changes the position of information projected onto a combiner based on information obtained by the front camera and the driver camera to enhance the visibility, wherein the front camera captures scenery in the field of the eyesight of the driver and the driver camera captures the variation of the relative position between the driver and the vehicle.

Patent Reference-1: Japanese Patent Application Laid-open under No. 2010-70066

DISCLOSURE OF INVENTION

Problem to be Solved by the Invention

According to Patent Reference-1, it is possible to reduce the deterioration of the visibility due to the vibration. However, unfortunately, the cost of establishing the system becomes high since it requires the front camera and the driver camera.

The above is an example of the problem to be solved by the present invention. An object of the present invention is to provide a display device capable of suppressing the deterioration of the visibility due to the vibration.

Means for Solving the Problem

One invention is a display device including: a display control unit configured to display a letter or a graphic on a display unit in a state that the letter or the graphic appears to overlap scenery visible from a vehicle; and a surface condition acquisition unit configured to obtain information on a degree of smoothness of a road surface where the vehicle is traveling, wherein the display control unit is configured to change a size of the letter or the graphic in accordance with the information on the degree of the smoothness obtained from the surface condition acquisition unit.

Another invention is a control method executed by a display device, including: a display control process to display a letter or a graphic on a display unit in a state that the letter or the graphic appears to overlap scenery visible from a vehicle; and a surface condition acquisition process to obtain information on a degree of smoothness of a road surface where the vehicle is traveling, wherein the display control process changes a size of the letter or the graphic in accordance with the information on the degree of the smoothness obtained from the surface condition acquisition process.

Still another invention is a program executed by a computer, making the computer function as: a display control unit configured to display a letter or a graphic on a display unit in a state that the letter or the graphic appears to overlap scenery visible from a vehicle; and a surface condition acquisition unit configured to obtain information on a degree of smoothness of a road surface where the vehicle is traveling, wherein the display control unit is configured to change a size of the letter or the graphic in accordance with the information on the degree of the smoothness obtained from the surface condition acquisition unit.

DETAILED DESCRIPTION OF THE PREFERRED EMBODIMENTS

According to a preferable embodiment of the present invention, there is provided a display device including: a display control unit configured to display a letter or a graphic on a display unit in a state that the letter or the graphic appears to overlap scenery visible from a vehicle; and a surface condition acquisition unit configured to obtain information on a degree of smoothness of a road surface where the vehicle is traveling, wherein the display control unit is configured to change a size of the letter or the graphic in accordance with the information on the degree of the smoothness obtained from the surface condition acquisition unit.

The above display device includes the display control unit and the surface condition acquisition unit. The display control unit is configured to display a letter or a graphic on a display unit in a state that the letter or the graphic appears to overlap scenery visible from a vehicle. The surface condition acquisition unit is configured to obtain information on a degree of smoothness of a road surface where the vehicle is traveling. The display control unit is configured to change a size of the letter or the graphic to be displayed on the display unit in accordance with the information on the degree of the smoothness obtained from the surface condition acquisition unit. In this way, the display device can change the display size of a letter or a graphic displayed on the display unit in accordance with the surface condition of the road thereby to make them preferably visible to the driver.

In one mode of the display device, the worse the degree of the smoothness of the road surface indicated by the information on the degree of the smoothness of the road surface is, the larger the display control unit makes the size of the letter or the graphic. According to this mode, even when traveling on ill-paved road surface, the display device enlarges the display size of the letter or the graphic thereby to let the driver visually recognize it.

In another mode of the display device, the display device further includes a speed acquisition unit configured to obtain a traveling speed of the vehicle and a vibration amount acquisition unit configured to obtain a vibration amount of the vehicle, wherein the surface condition acquisition unit is configured to obtain information on the degree of the smoothness based on the traveling speed and the vibration amount. According to this mode, the display device can preferably estimate the degree of the smoothness of the road surface.

In another mode of the display device, the surface condition acquisition unit is configured to obtain the information on the degree of the smoothness from map data in which information on the degree of the smoothness per road is recorded. Even in this mode, the display device preferably obtains the information on the degree of the smoothness of the road surface to determine the display size of the letter or the graphic.

In another mode of the display device, the display device further includes a speed acquisition unit configured to obtain a traveling speed of the vehicle, wherein the display control unit is configured to change the size of the letter or the graphic in accordance with an estimated vibration amount which is estimated based on the information on the degree of the smoothness and the traveling speed. According to this mode, the display device preferably estimates the vibration amount of the vehicle and changes the display size of the letter or the graphic based on the estimated vibration amount.

In another mode of the display device, the surface condition acquisition unit is configured to obtain a vibration amount detected by a sensor as the information on the degree of the smoothness, the sensor detecting a vibration of the vehicle, and the display control unit is configured to change the size of the letter or the graphic in accordance with the vibration amount obtained by the surface condition acquisition unit. According to this mode, the display device properly changes the display size of the letter or the graphic based on the detected vibration amount.

According to another preferable embodiment of the present invention, there is provided a control method executed by a display device, including: a display control process to display a letter or a graphic on a display unit in a state that the letter or the graphic appears to overlap scenery visible from a vehicle; and a surface condition acquisition process to obtain information on a degree of smoothness of a road surface where the vehicle is traveling, wherein the display control process changes a size of the letter or the graphic in accordance with the information on the degree of the smoothness obtained from the surface condition acquisition process. By executing the above-mentioned control method, the display device can change the display size of a letter or a graphic to be displayed on the display unit in accordance with the surface condition of the road thereby to make it preferably visible to the driver.

According to still another preferable embodiment of the present invention, there is provided a program executed by a computer, making the computer function as: a display control unit configured to display a letter or a graphic on a display unit in a state that the letter or the graphic appears to overlap scenery visible from a vehicle; and a surface condition acquisition unit configured to obtain information on a degree of smoothness of a road surface where the vehicle is traveling, wherein the display control unit is configured to change a size of the letter or the graphic in accordance with the information on the degree of the smoothness obtained from the surface condition acquisition unit. By executing the program, the computer can change the display size of a letter or a graphic to be displayed on the display unit in accordance with the surface condition of the road thereby to make it preferably visible to the driver. In a preferred example, the above program is stored in a recording medium.

EMBODIMENT

Now, preferred first to third embodiments of the present invention will be described below with reference to the attached drawings.

First Embodiment

Firstly, a description will be given of the first embodiment.

[Schematic Configuration]
(1) System Configuration

Figure 1:
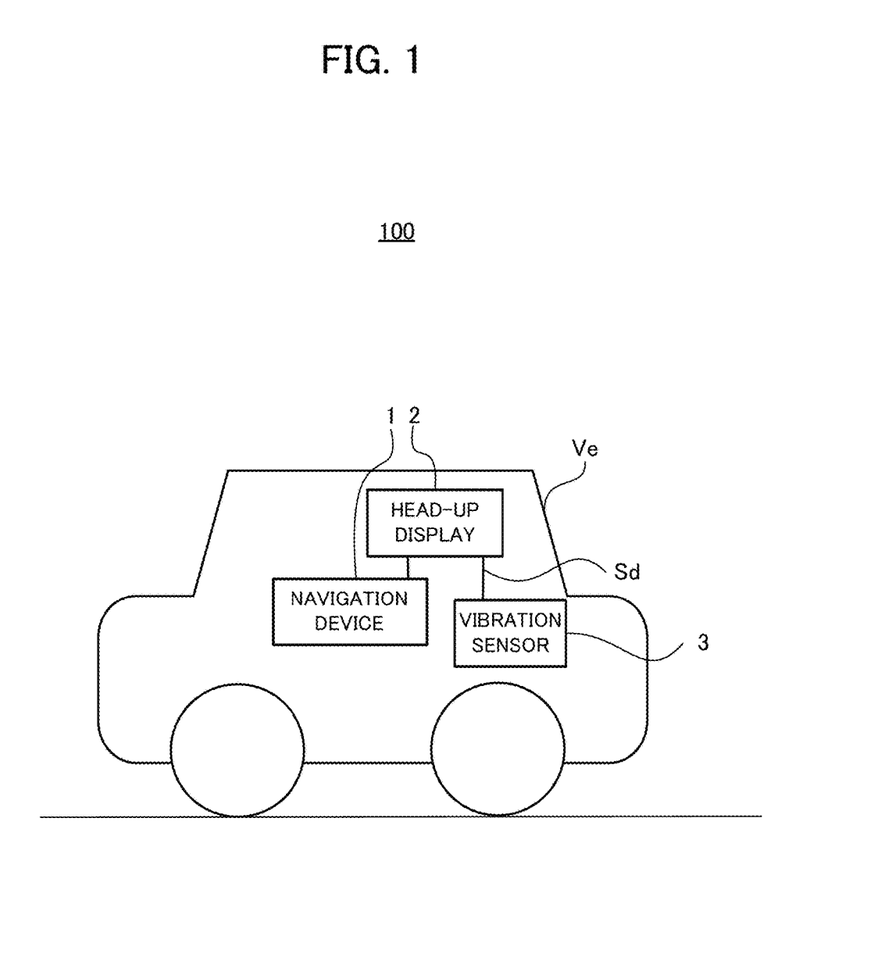
FIG. 1 illustrates the schematic configuration of a display system.

FIG. 1 illustrates an example of the configuration of a display system 100 according to the first embodiment. As illustrated in FIG. 1, the display system 100 is mounted on a vehicle Ve and includes a navigation device 1, a head-up display 2 and a vibration sensor 3.

The navigation device 1 has a guide function of a route from a departure place to a destination. Examples of the navigation device 1 include a stationary navigation device installed on a vehicle, a PND (Portable Navigation Device) and a cell phone such as a smart phone.

The head-up display 2 generates an image (referred to as "guide image") indicating guide information for assisting the driving operation such as map information indicating the present position, route guide information, a traveling speed of the vehicle Ve and a facility mark, and lets the driver visually recognize the guide image as a virtual image from the position of the eye (eye point) of the driver. As described later, by adjusting the size of each guide image in accordance with the road surface condition, the head-up display 2 preferably lets the driver visually recognize each guide image even when the vehicle Ve is vibrating.

The vibration sensor 3 detects the vibration amount of the vehicle Ve. Then, the vibration sensor 3 supplies the head-up display 2 with a detection signal Sd indicating the detected vibration amount.

It is noted that the navigation device 1 may be held by a cradle if the navigation device 1 is a cell phone such as a smart phone. In this case, the navigation device 1 may exchange the information with the head-up display 2 via the cradle. It is also noted that the vibration sensor 3 may be connected to the navigation device 1 instead of the head-up display 2. In this case, when the navigation device 1 receives the detection signal Sd from the vibration sensor 3, the navigation device 1 forwards the detection signal Sd to the head-up display 2.

(2) Configuration of Navigation Device

Figure 2:
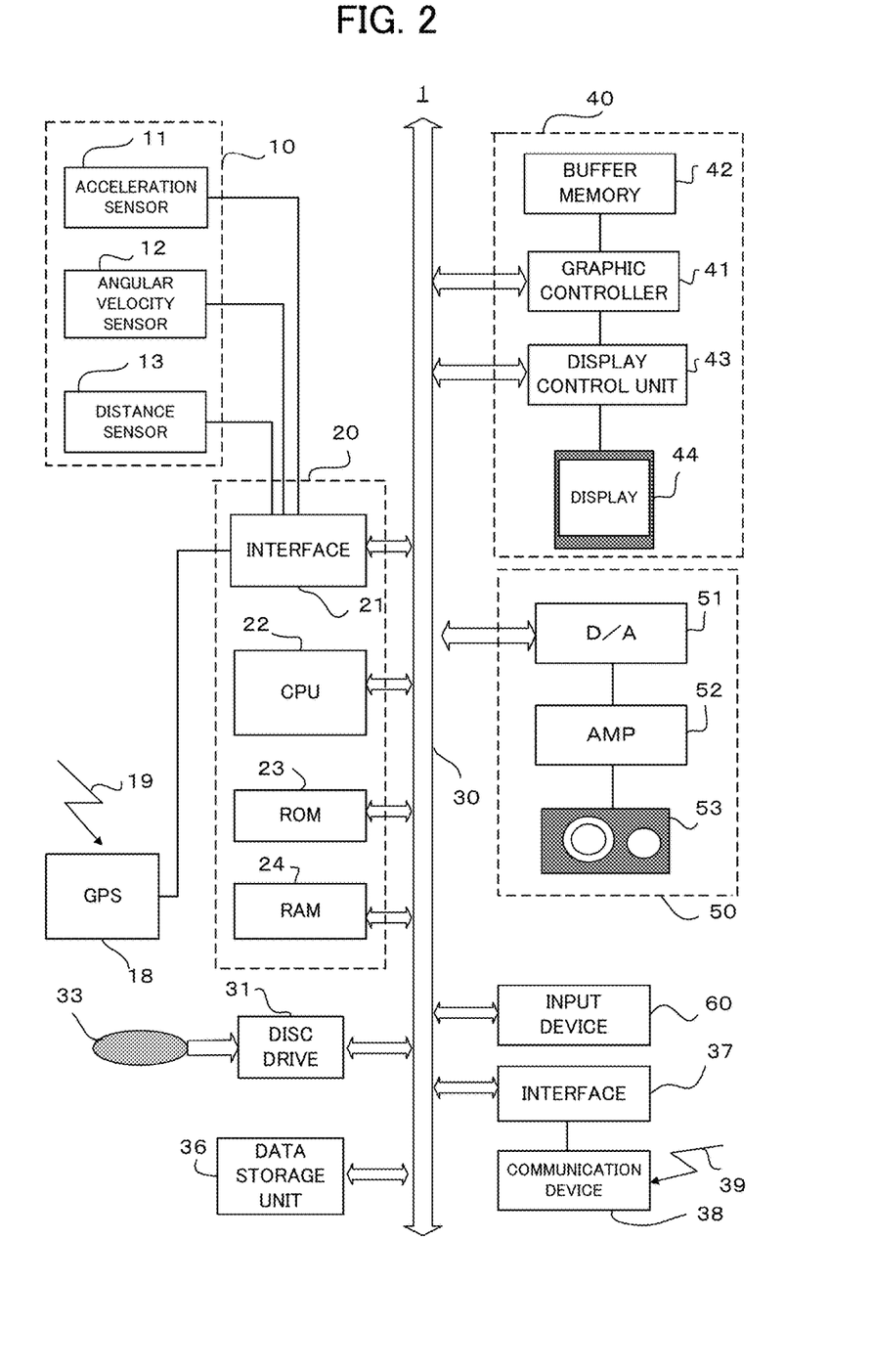
FIG. 2 illustrates the schematic configuration of a navigation device.

FIG. 2 illustrates a device configuration of the navigation device 1. As shown in FIG. 2, the navigation device 1 includes a stand-alone position measurement device 10, a GPS receiver 18, a system controller 20, a disc drive 31, a data storage unit 36, a communication interface 37, a communication device 38, a display unit 40, a sound output unit 50, and an input device 60.

The stand-alone position measurement device 10 includes an acceleration sensor 11, an angular velocity sensor 12 and a distance sensor 13. The acceleration sensor 11 includes a piezoelectric element, for example, and detects the acceleration degree of the vehicle Ve and outputs the acceleration data. The angular velocity sensor 12 includes a vibration gyroscope, for example, and detects the angular velocity of the vehicle Ve at the time of changing the direction of the vehicle Ve and outputs the angular velocity data and the relative direction data. The distance sensor 13 measures vehicle speed pulses including a pulse signal generated with the wheel rotation of the vehicle Ve.

The GPS receiver 18 receives an electric wave 19 for transmitting downlink data including position measurement data from plural GPS satellites, which is used for detecting the absolute position (hereinafter referred to as "present position") of the vehicle from longitude and latitude information.

The system controller 20 includes an interface 21, a CPU (Center Processing Unit) 22, a ROM (Read Only Memory) 23 and a RAM (Random Access Memory) 24, and is configured to control the entire navigation device 1.

The interface 21 executes the interface operation with the acceleration sensor 11, the angular velocity sensor 12, the distance sensor 13 and the GPS receiver 18. Then, the interface 21 inputs the vehicle speed pulse, the acceleration data, the relative direction data, the angular velocity data, the GPS measurement data and the absolute direction data into the system controller 20. The CPU 22 controls the entire system controller 20. The ROM 23 includes a non-volatile memory (not shown) in which a control program for controlling the system controller 20 is stored. The RAM 24 readably stores various kinds of data such as route data preset by the user via the input device 60, and supplies a working area to the CPU 22.

The system controller 20, the disc drive 31 such as a CD-ROM drive or a DVD-ROM drive, the data storage unit 36, the communication interface 37, the display unit 40, the sound output unit 50 and the input device 60 are connected to each other via a bus line 30.

Under the control of the system controller 20, the disc drive 31 reads contents data such as sound data and video data from a disc 33 such as a CD and a DVD to output the contents data. The disc drive 31 may be the CD-ROM drive or the DVD-ROM drive, or may be a drive compatible between the CD and the DVD.

The data storage unit 36 includes a HDD, for example, and stores various kinds of data used for a navigation process such as map data. The map data includes road data and facility information on each facility, wherein the road data is expressed by links corresponding to roads and nodes corresponding to connection parts (intersections) of roads.

The communication device 38 includes an FM tuner or a beacon receiver, a mobile phone and a dedicated communication card for example, and receives road traffic information such as traffic jam information and traffic information and other information delivered from a VICS (Vehicle Information Communication System) center via the communication interface 37. The communication device 38 sends the head-up display 2 various kinds of information used for the navigation processing such as guide route information, present position information obtained from the GPS receiver 18, information on vehicle speed pulses obtained from the stand-alone position measurement device 10 and map data.

The display unit 40 displays various kinds of display data on a display screen of a display 44 under the control of the system controller 20. Concretely, the system controller 20 reads the map data from the data storage unit 36, and the display unit 40 displays, on its display screen, the map data read from the data storage unit 36 by the system controller 20. The display unit 40 includes a graphic controller 41 for controlling the entire display unit 40 on the basis of the control data transmitted from the CPU 22 via the bus line 30, a buffer memory 42 having a memory such as a VRAM (Video RAM) for temporarily storing immediately displayable image information, a display control unit 43 for controlling a display 44 such as a liquid crystal and a CRT (Cathode Ray Tube) on the basis of the image data outputted from the graphic controller 41, and the display 44. The display 44 is formed by a liquid crystal display device of the opposite angle 5-10 inches, and is mounted in the vicinity of a front panel of the vehicle.

The sound output unit 50 includes a D/A converter 51 for executing D/A (Digital to Analog) conversion of the sound digital data transmitted from the CD-ROM drive 31, a DVD-ROM 32 or the RAM 24 via the bus line 30 under the control of the system controller 20, an amplifier (AMP) 52 for amplifying a sound analog signal outputted from the D/A converter 51, and a speaker 53 for converting the amplified sound analog signal into the sound and outputting it to the vehicle compartment.

The input device 60 includes keys, switches, buttons, a remote controller and a sound input device, which are used for inputting various kinds of commands and data. The input device 60 is arranged in the vicinity of the display 44 and a front panel of a main body of an on-vehicle electric system loaded on the vehicle. Additionally, in such a case that the display 44 is in a touch panel system, a touch panel provided on the display screen of the display 44 also functions as the input device 60.

[Configuration of Head-Up Display]

Figure 3:
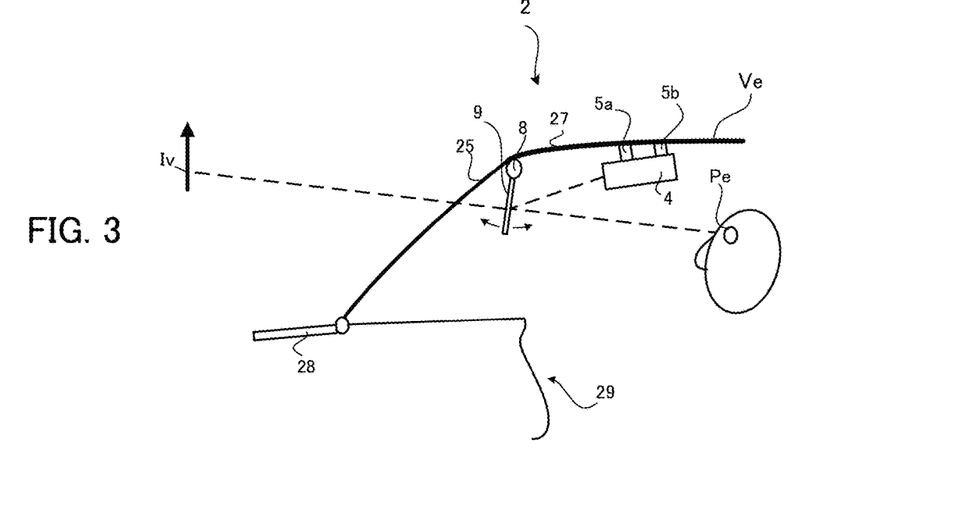
FIG. 3 illustrates the schematic configuration of a head-up display.

FIG. 3 schematically illustrates configuration of the head-up display 2. As illustrated by FIG. 3, the head-up display 2 according to the embodiments includes a light source unit 4 and a combiner 9, and is installed in the vehicle Ve having a front window 25, a ceiling board 27, a hood 28 and a dashboard 29.

The light source unit 4 is provided through the support parts 5a and 5b on the ceiling board 27 of the vehicle interior, and emits the light for displaying an guide image illustrating driver assist information towards the combiner 9 thereby to let the driver visually recognize the virtual image "Iv" via the combiner 9.

The display image emitted from the light source unit 4 is projected onto the combiner 9, and the combiner 9 shows the display image as the virtual image Iv by reflecting the display image towards the eye point "Pe" of the driver. The combiner 9 has a support shaft 8 provided on the ceiling board 27 and rotates on the support shaft 8. For example, the support shaft 8 is provided on the ceiling board 27 near the top edge of the front window 25, i.e., near the position of a sun visor (not shown) for the driver. It is noted that the support shaft 8 may be provided in place of the above-mentioned sun visor. The combiner 9 is an example of "the display unit" according to the present invention.

(4) Configuration of Light Source Unit

Figure 4:
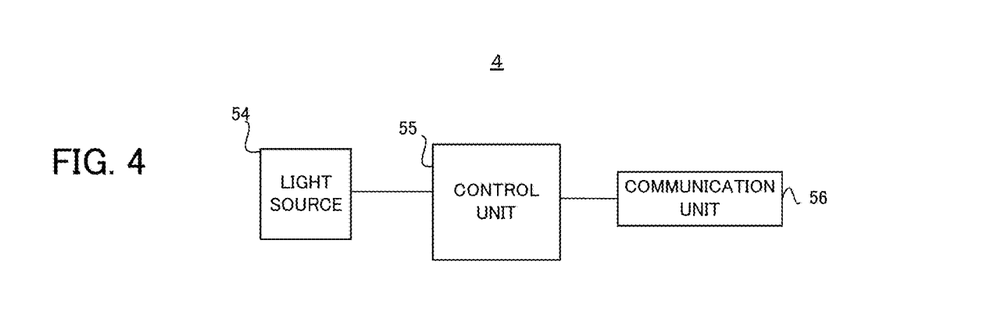
FIG. 4 illustrates the schematic configuration of alight source unit.

FIG. 4 schematically illustrates the configuration of the light source unit 4. As illustrated in FIG. 4, the light source unit 4 includes a light source 54, a control unit 55 and a communication unit 56.

The light source 54 includes laser light sources corresponding to red, blue and green, and projects the light (referred to as "display light") for displaying an image onto the combiner 9 under the control of the control unit 55.

Under the control of the control unit 55, the communication unit 56 receives various kind of information used for navigation processing from the navigation device 1. For example, the communication unit 56 receives information needed to generate the guide image such as guide route information, present position information and traveling speed information. The communication unit 56 also receives the detection signal Sd from the vibration sensor 3.

The control unit 55 includes a CPU, a ROM which stores control programs and data used by the CPU, and a RAM in which various kinds of data are sequentially read out and stored as a working memory, and performs a general control of the head-up display 2.

The control unit 55 generates the guide image on the basis of the information sent from the navigation device 1 thereby to let the light source 54 emit the light for displaying the guide image. According to the first embodiment, on the basis of the information on the traveling speed obtained from the navigation device 1 and the vibration amount indicated by the detection signal Sd obtained from the vibration sensor 3, the control unit 55 recognizes the surface condition of the road (simply referred to as "traveling road") on which the vehicle Ve is traveling. Then, the control unit 55 changes the display size of the guide image in accordance with the recognized surface condition of the traveling road. The detail will be explained in the section "Adjustment of Display Size".

The control unit 55 functions as "the surface condition acquisition unit", "the display control unit", "the speed acquisition unit", "the vibration amount acquisition unit" and the computer which runs the program according to the present invention.

[Adjustment of Display Size]

Next, a description will be given of the adjustment method of the display size of the guide image which indicates letter(s) or a graphic. Schematically, on the basis of the traveling speed of the vehicle Ve and the vibration amount indicated by the detection signal Sd, the control unit 55 calculates an index (referred to as "smoothness determination index $\alpha$") of the degree of the smoothness of the traveling road, and changes the display size of the guide image in stages in accordance with the smoothness determination index $\alpha$. Thereby, the control unit 55 improves the visibility of the guide image at the time of traveling on a rough road while the control unit 55 improves the front visibility of the guide image at the time of traveling on a flat road. The smoothness determination index $\alpha$ is an example of "the information on the degree of the smoothness". According to the first embodiment, it is assumed that the smoother the road surface is, the lower the smoothness determination index $\alpha$ becomes.

(1) Calculation Method of Smoothness Determination Index

Firstly, a description will be given of the calculation method of the smoothness determination index $\alpha$. According to the first embodiment, the control unit 55 recognizes that the vibration amount of the vehicle Ve is proportional to the smoothness determination index $\alpha$ of the traveling road and to the traveling speed of the vehicle Ve. Namely, when the traveling speed of the vehicle speed is expressed by "X" and the vibration amount of the vehicle Ve is expressed by "Y", the control unit 55 uses the following equation (1).

$$Y = \alpha \cdot X \quad (1)$$

Figure 5:
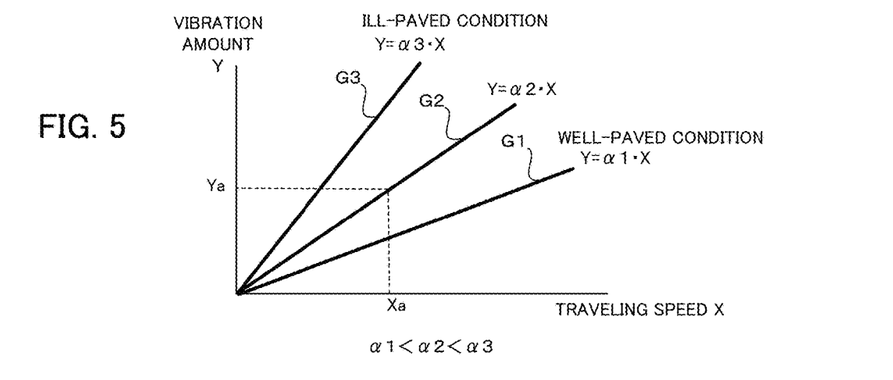
FIG. 5 illustrates graphs indicating a relationship between the traveling speed of a vehicle and the vibration amount of the vehicle.

With reference to FIG. 5, a description will be given of the relationship indicated by the equation (1). FIG. 5 illustrates graphs G1 to G3 in the case where X-axis is the traveling speed of the vehicle Ve and Y-axis is the vibration amount of the vehicle Ve. The graph G1 indicates a relationship between the traveling speed and the vibration amount in such a case that the smoothness determination index $\alpha$ is a relatively low value "$\alpha 1$", i.e., the traveling road is well paved. The graph G3 indicates a relationship between the traveling speed and the vibration amount in such a case that the smoothness determination index $\alpha$ is a relatively high value "$\alpha 3$", i.e., the traveling road is ill paved. The graph G2 indicates a relationship between the traveling speed and the vibration amount in such a case that the smoothness determination index $\alpha$ is an intermediate value "$\alpha 2$" between "$\alpha 1$" and "$\alpha 3$".

As indicated by FIG. 5, the vibration amount becomes proportionally large as the traveling speed is high, and the larger the smoothness determination index $\alpha$ is, the higher the change rate of the vibration amount to the traveling speed becomes. Thus, on the basis of the traveling speed and the vibration amount, the control unit 55 can calculate the smoothness determination index $\alpha$ corresponding to the inclination of the graph.

In the first embodiment, by using the moving average (referred to as "speed average Xa") of the time-series traveling speed and the moving average (referred to as "vibration average Ya") of the detected time-series vibration amount, the control unit 55 calculates the smoothness determination index $\alpha$ according to the following equation (2).

$$\alpha = Ya/Xa \quad (2)$$

In the case of FIG. 5, the control unit 55 calculates the smoothness determination index $\alpha 2$ by using the speed average Xa and the vibration average Ya. In this case, the control unit 55 calculates the speed average Xa based on the information on a predetermined number of the traveling speed which are most recently obtained from the navigation device 1, and calculates the vibration average Ya based on the information on the a predetermined number of the detection signal Sd which are most recently obtained from the vibration sensor 3. The above-mentioned predetermined numbers are determined to adaptive values through experimental trials, for example. By calculating the smoothness determination index $\alpha$ from the moving averages of the traveling speed and the vibration amount, the control unit 55 preferably omits random noise components.

(2) Determination Method of Display Size

Next, a description will be given of the determination method of the display size of the guide image. The control unit 55 recognizes the level (referred to as "determination level Lv") of the calculated smoothness determination index $\alpha$, and determines the display size of the guide image in accordance with the determination level Lv. Hereinafter, the determination level Lv has four stages from level 1 to level 4, and the larger the smoothness determination index $\alpha$ is, the higher the determination level Lv becomes.

Figure 6:
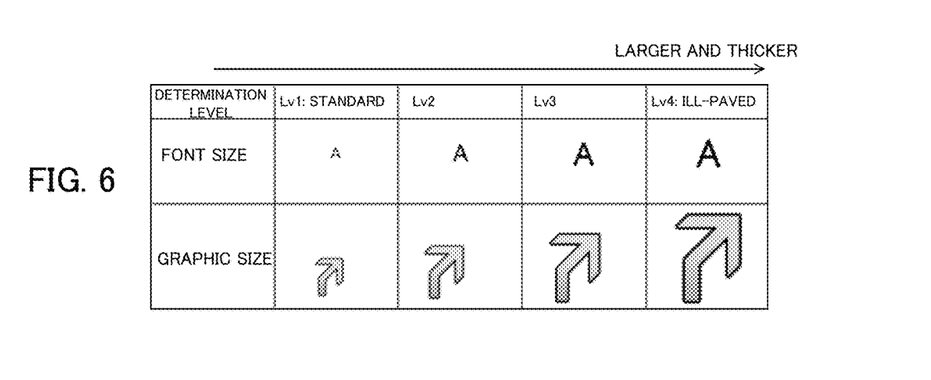
FIG. 6 is a table visually indicating a relationship between the determination level and the font size and graphic size of a guide image.

FIG. 6 is a table visually indicating a relationship between the determination level Lv and the font size and graphic size of the guide image. As indicated by FIG. 6, the higher the determination level Lv is, the larger the font size of letter(s) indicated by the guide image and the size of graphic(s) indicated by the guide image which the control unit 55 determines becomes. Specifically, the control unit 55 stores in advance a quantified table indicating a relationship as illustrated in FIG. 6 between the determination level Lv and the font size and the graphic size of the guide image. Namely, the control unit 55 stores in advance values indicating the font size and the graphic size of the guide image corresponding to each determination level Lv.

In this way, in such a case that the determination level Lv of the traveling road is high and therefore the traveling road is estimated to be in an ill-paved condition, the control unit 55 determines that the visibility of the guide image is low due to the vibration of the vehicle Ve, and enlarges the display size of the letters and the graphic indicated by the guide image. Thereby, the control unit 55 enhances the visibility of the guide image to preferably let the driver visually recognize the guide image. In contrast, in such a case that the determination level Lv of the traveling road is low and therefore the degree of the smoothness of the traveling road is estimated to be high, the control unit 55 determines that the visibility of the guide image is high and displays the guide image at a standard (normal) size. Thereby, the control unit 55 prevents the driver's visibility from deteriorating due to the guide image being unnecessarily large, and preferably ensures the visibility of the front scenery of the driver.

Additionally, regarding the determination of the determination level Lv, the control unit 55 lets the threshold of the smoothness determination index $\alpha$ for determining the determination level Lv have a hysteresis in order to prevent the display size of the guide image from frequently varying. The detail will be described with reference to FIG. 7.

Figure 7:
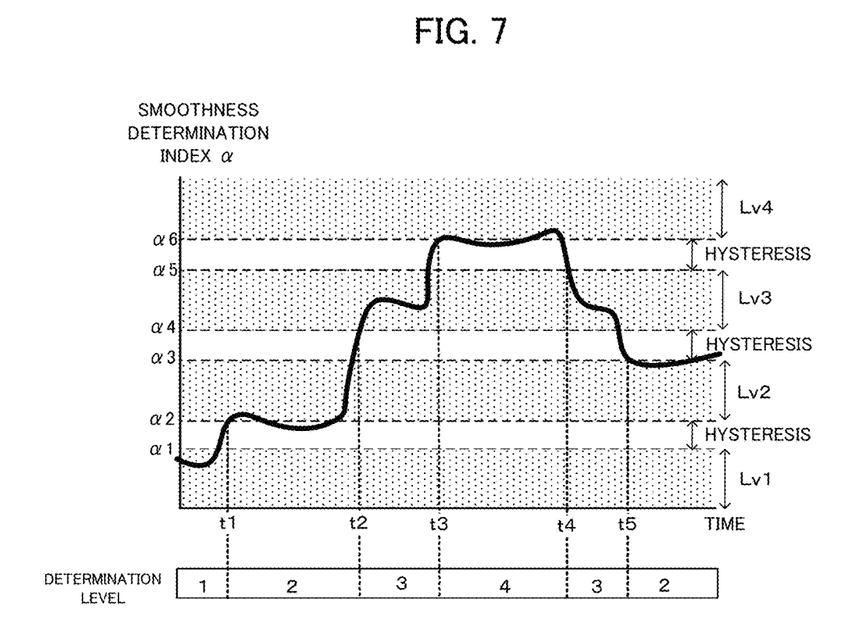
FIG. 7 illustrates a graph indicating the time variation of a smoothness determination index and a determination level of the traveling road in a case where the vehicle travels in a predetermined time period.

FIG. 7 is a graph indicating the time variation of the smoothness determination index $\alpha$ and the determination level Lv of the traveling road in a case where the vehicle Ve travels in a predetermined time period. In the case of FIG. 7, the control unit 55 determines each thresholds of the smoothness determination index $\alpha$ so that each of the thresholds ($\alpha 1$, $\alpha 3$, $\alpha 5$) of the smoothness determination index $\alpha$ for determining the downgrade of the determination level Lv from a target level to the next level is smaller than each corresponding threshold ($\alpha 2$, $\alpha 4$, $\alpha 6$) of the smoothness determination index $\alpha$ for determining the upgrade of the determination level Lv to the target level. Hereinafter, the above-mentioned thresholds for determining the upgrade is referred to as "upgrading threshold" and the above-mentioned thresholds for determining the downgrade is referred to as "downgrading threshold".

Specifically, the control unit 55 sets the upgrading threshold for upgrading the determination level Lv from level 1 to level 2 to "$\alpha 2$", and sets the downgrading threshold for downgrading the determination level Lv from level 2 to level 1 to "$\alpha 1$" which is lower than $\alpha 2$. Similarly, the control unit 55 sets the upgrading threshold for upgrading the determination level Lv from level 2 to level 3 to "$\alpha 4$" and sets the downgrading threshold for downgrading the determination level Lv from level 3 to level 2 to "$\alpha 3$" which is lower than $\alpha 4$. The control unit 55 also sets the upgrading threshold for upgrading the determination level Lv from level 3 to level 4 to "$\alpha 6$" and sets the downgrading threshold for downgrading the determination level Lv from level 4 to level 3 to "$\alpha 5$" which is lower than $\alpha 6$. The control unit 55 determines each threshold $\alpha 1$ to $\alpha 6$ to an adaptive value obtained through experimental trials, and stores them on its memory in advance.

In case of FIG. 7, at the time "t1", the control unit 55 upgrades the determination level Lv from level 1 to level 2 since the smoothness determination index $\alpha$ calculated according to the equation (2) becomes equal to or larger than the upgrading threshold $\alpha 2$. Thereafter, the control unit 55 maintains the determination level Lv at level 2 even if the smoothness determination index $\alpha$ falls below the upgrading threshold $\alpha 2$ in such a condition that it is equal to or larger than the downgrading threshold $\alpha 1$. Next, at the time "t2", the control unit 55 upgrades the determination level Lv from level 2 to level 3 since the smoothness determination index $\alpha$ becomes equal to or larger than the upgrading threshold $\alpha 4$. Furthermore, at the time "t3", the control unit 55 upgrades the determination level Lv from level 3 to level 4 since the smoothness determination index $\alpha$ becomes equal to or larger than the upgrading threshold $\alpha 6$.

Thereafter, at the time "t4", the control unit 55 downgrades the determination level Lv from level 4 to level 3 since the smoothness determination index $\alpha$ falls below the downgrading threshold $\alpha 5$. Similarly, the control unit 55 lowers the determination level Lv from level 3 to level 2 since the smoothness determination index $\alpha$ falls below the downgrading threshold $\alpha 3$.

In this way, in the case of FIG. 7, the control unit 55 determines each upgrading threshold and downgrading threshold so that the downgrading threshold for determining the upgrade of the determination level Lv from a target level to the next level is smaller than the upgrading threshold for determining the upgrade of the determination level Lv to the target level. Thereby, even when the smoothness determination index $\alpha$ goes up and down, the control unit 55 can preferably suppress the determination level Lv from frequently switching.

(3) Process Flow

Figure 8:
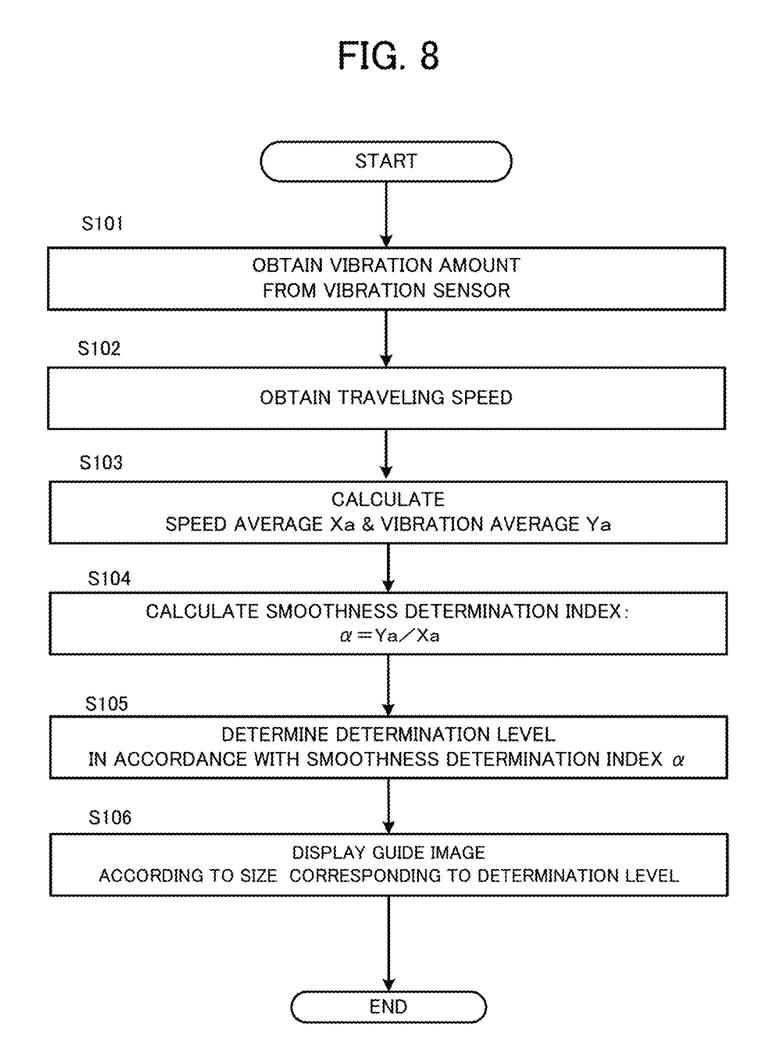
FIG. 8 is a flowchart indicating the display process of the guide image according to the first embodiment.

FIG. 8 is a flowchart indicating the display process of the guide image according to the first embodiment. The control unit 55 repeatedly executes the process of the flowchart illustrated in FIG. 8 in a predetermined cycle.

First, the control unit 55 obtains the detection signal Sd indicating the vibration amount detected by the vibration sensor 3 (step S101). Next, the control unit 55 obtains from the navigation device 1 the information on the traveling speed of the vehicle Ve measured by the distance sensor 13 (step S102). Then, the control unit 55 calculates the speed average Xa and the vibration average Ya wherein the speed average Xa is a moving average of a predetermined number of the previously-obtained traveling speed and the vibration average Ya is a moving average of the vibration amount indicated by a predetermined number of the previously-obtained detection signal Sd (step S103).

Next, according to the equation (2), the control unit 55 calculates the smoothness determination index $\alpha$ based on the calculated speed average Xa and the calculated vibration average Ya (step S104). Next, the control unit 55 determines the determination level Lv based on the smoothness determination index $\alpha$ with reference to the thresholds $\alpha 1$ to $\alpha 6$ described in FIG. 7 (step S105). Then, on the basis of the information indicating a correspondence relationship between the determination level Lv and the display size of the guide image as indicated by FIG. 6, the control unit 55 determines the display size of each guide image and displays each guide image through the combiner 9 (step S106).

(4) Display Example

Next, a description will be given of display examples of the first embodiment with reference to FIGS. 9A and 9B.

Figure 9A:
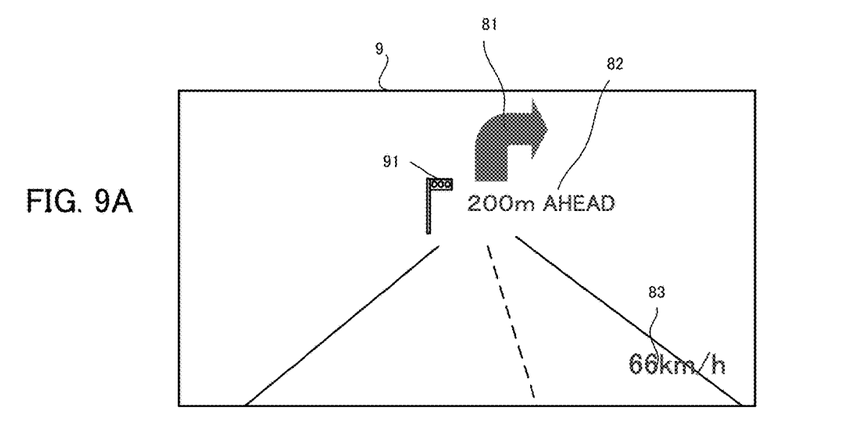
FIGS. 9A and 9B illustrate display examples through a combiner.

FIG. 9A illustrates the front scenery which the driver visually recognize through the combiner 9 in a case where the degree of the smoothness of the traveling road is high. In the case of FIG. 9A, through the combiner 9, the control unit 55 displays, as guide images, an arrow image 81 indicating the traveling direction of the next guide point to turn right, a distance display image 82 indicating the distance to the guide point, and a speed display image 83 indicating the present traveling speed of the vehicle Ve.

In the case of FIG. 9A, the control unit 55 sets the determination level Lv to level 1 since the control unit 55 determines that the smoothness determination index $\alpha$ calculated according to the equation (2) from the speed average Xa and the vibration average Ya is lower than the upgrading threshold $\alpha 2$ described in FIG. 7. Thus, in this case, the control unit 55 displays each guide images 81 to 83 at a standard (normal) size.

Figure 9B:
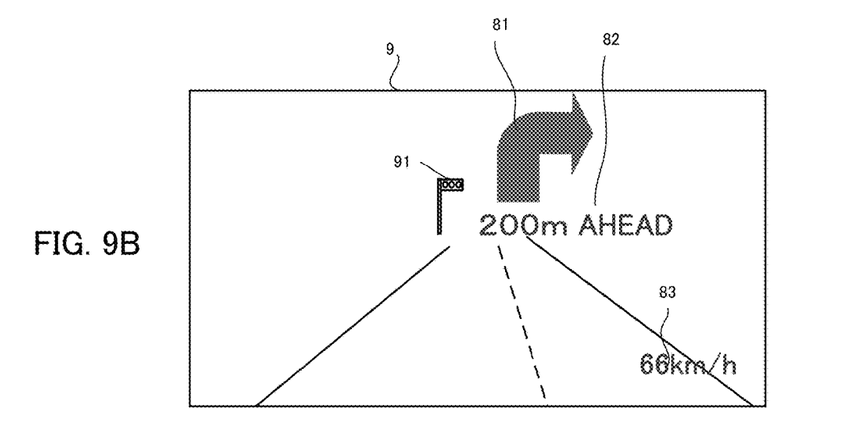

FIG. 9B illustrates the front scenery which the driver visually recognize through the combiner 9 in a case where the traveling road is in an ill-paved condition. In the case of FIG. 9B, the control unit 55 sets the determination level Lv to level 3 since the control unit 55 determines that the smoothness determination index $\alpha$ calculated according to the equation (2) from the speed average Xa and the vibration average Ya is equal to or larger than the upgrading threshold $\alpha 4$ described in FIG. 7. Thus, in this case, the control unit 55 displays the arrow image 81 whose display size is larger than the standard size by a predetermined rate, and also displays the distance display image 82 whose font size is larger than the standard font size by a predetermined rate. Thereby, even when the traveling road is in an ill-paved condition, it is possible to preferably let the driver visually recognize the arrow image 81 and the distance display image 82.

In the case of FIG. 9B, the control unit 55 does not enlarge the font size of the speed display image 83 indicating relatively less important information. In this way, preferably, the control unit 55 selectively enlarges a guide image whose priority to be visually recognized by the driver is high while the control unit 55 does not enlarge a guide image whose priority to be visually recognized by the driver is low. Thereby, the control unit 55 preferably ensures the visibility of the front scenery of the driver. In this case, for example, the control unit 55 stores a table in advance and determines the display size of each guide image with reference to the table, wherein the table indicates types of the guide image whose display size is to be changed in accordance with the determined determination level Lv and types of the guide image whose display size is to be fixed regardless of the determination level Lv.

As described above, the head-up display 2 according to the first embodiment includes the light source unit 4 and the combiner 9. The control unit 55 of the light source unit 4 displays on the combiner 9 a guide image indicating a letter or a graphic so that the guide image appears to overlap the background visible from a vehicle Ve. On the basis of a detection signal Sd sent from a vibration sensor 3 and the traveling speed of the vehicle Ve, the control unit 55 obtains the smoothness determination index $\alpha$ that is information on the degree of smoothness of the road surface on which the vehicle Ve is traveling. The control unit 55 changes the size of the letter or the graphic displayed on the combiner 9 in accordance with the smoothness determination index $\alpha$. Thereby, the head-up display 2 changes the display size of the letter and the graphic in accordance with the road surface condition thereby to preferably let the diver visually recognize them.

Second Embodiment

Figure 10:
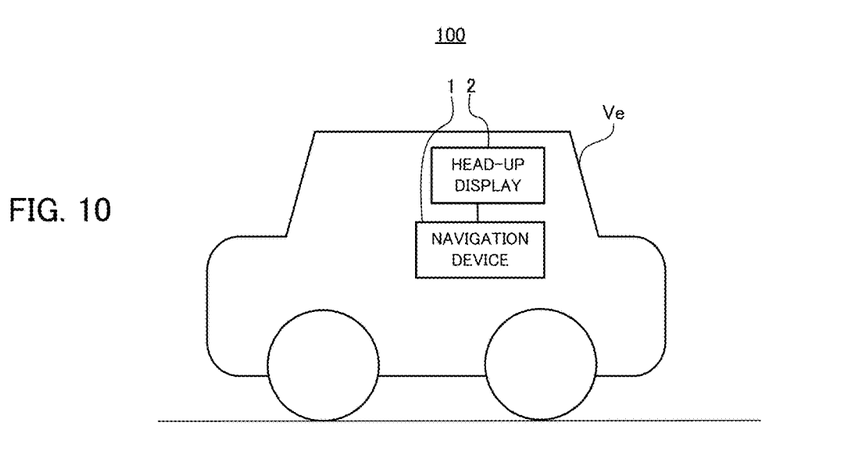
FIG. 10 illustrates the schematic configuration of a display system according to the second embodiment.

FIG. 10 illustrates the schematic configuration of the display system 100 according to the second embodiment. The second embodiment is different from the first embodiment in that the control unit 55 obtains the smoothness determination index $\alpha$ by referring to the smoothness determination index $\alpha$ which is stored per road on the data storage unit 36 in advance as a part of the map data instead of calculating the smoothness determination index $\alpha$ according to the equation (2) by using the detection signal Sd sent from the vibration sensor 3. Other same components as the first embodiment are provided with the same reference numbers and the explanation thereof will be omitted as appropriate.

According to the second embodiment, the data storage unit 36 associates each smoothness determination index $\alpha$ with link data corresponding to each road and stores them as map data in advance. Then, the control unit 55 recognizes the traveling road by obtaining the present position measured by the GPS receiver 18 from the navigation device 1 and obtains the smoothness determination index $\alpha$ associated with the link data corresponding to the recognized traveling road from the map data stored on the data storage unit 36. Thereafter, the control unit 55 determines the determination level Lv in the same way as the first embodiment and changes the display size of the guide image in accordance with the determination level Lv.

In the case of the display system 100 according to the second embodiment, the control unit 55 does not have to obtain the detection signal Sd from the vibration sensor 3 nor the information on the traveling speed of the vehicle Ve from the navigation device 1. Thus, the control unit 55 can easily determine the display size of the guide image.

It is noted that the map data may be stored on an external server which is not shown and that the head-up display 2 may obtain map information around the present position of the vehicle Ve and the smoothness determination index $\alpha$ via the network.

Third Embodiment

In addition to the second embodiment, the control unit 55 according to the third embodiment calculates an estimate value (referred to as "estimated vibration amount Ye") of the vibration amount of the vehicle Ve based on the smoothness determination index $\alpha$ obtained from the map data and the traveling speed of the vehicle Ve, and determines the determination level Lv in accordance with the estimated vibration amount Ye.

Specifically, the control unit 55 calculates the estimated vibration amount Ye according to the following equation (3) based on the smoothness determination index $\alpha$ in the map data corresponding to the traveling road and the speed average Xa calculated in the same way as the first embodiment.

$$Ye = \alpha \cdot Xa \quad (3)$$

Figure 11:
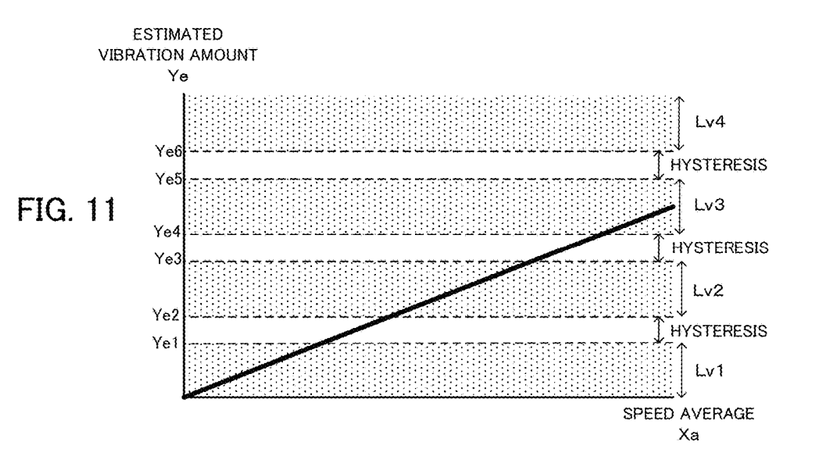
FIG. 11 illustrates a graph indicating a relationship between a traveling speed of the vehicle and an estimated vibration amount when the vehicle travels on a road corresponding to a predetermined smoothness determination index.

Then, the control unit 55 determines the determination level Lv based on the calculated estimated vibration amount Ye. FIG. 11 illustrates a graph indicating a relationship between the speed average Xa and the estimated vibration amount Ye in a condition where the smoothness determination index $\alpha$ is fixed. In the case of FIG. 11, as with the case of FIG. 7, the control unit 55 determines each upgrading threshold and downgrading threshold regarding the estimated vibration amount Ye so that the downgrading threshold (Ye1, Ye3, Ye5) of the estimated vibration amount Ye for determining the downgrade of the determination level Lv from a target level to the next level is smaller than each corresponding upgrading threshold (Ye2, Ye4, Ye6) of the estimated vibration amount Ye for determining the upgrade of the determination level Lv to the target level. Thereby, even when the estimated vibration amount Ye calculated according to the equation (3) goes up and down, the control unit 55 can preferably suppress the determination level Lv from frequently switching.

Figure 12:
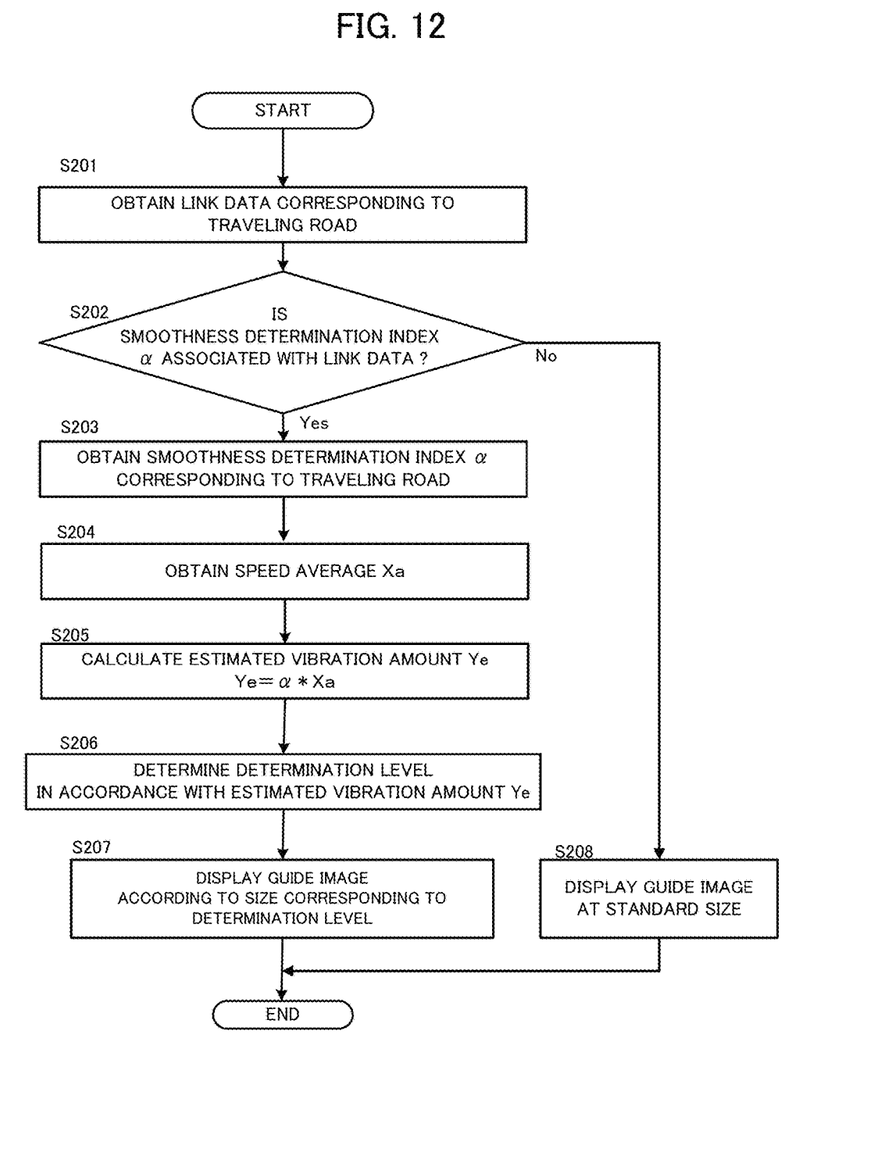
FIG. 12 is a flowchart indicating the display process of the guide image according to the third embodiment.

FIG. 12 is a flowchart indicating the display process of the guide image according to the third embodiment. The control unit 55 repeatedly executes the process of the flowchart illustrated in FIG. 12 in a predetermined cycle.

First, by obtaining the present position measured by the GPS receiver 18 from the navigation device 1, the control unit 55 obtains the link data corresponding to the traveling road from the map data (step S201). Then, the control unit 55 determines whether or not the smoothness determination index α associated with the obtained link data is stored (step S202).

Then, when the smoothness determination index α associated with the obtained link data is stored (step S202; Yes), the control unit 55 obtains the smoothness determination index α (step S203). Thereafter, the control unit 55 calculates the speed average Xa in the same way as the first embodiment (step S204), and calculates the estimated vibration amount Ye according to the equation (3) (step S205).

Then, the control unit 55 determines the determination level Lv in accordance with the estimated vibration amount Ye (step S206). Specifically, the control unit 55 determines the determination level Lv based on the estimated vibration amount Ye calculated at step S204 and the thresholds (Ye1 to Ye6 in the case of FIG. 7) for determining the determination level Lv. Then, the control unit 55 displays each guide image according to the size corresponding to the determined determination level Lv (step S207). In this case, the control unit 55 may selectively change the display size only with respect to a specific type of the guide image as explained in the display example illustrated in FIG. 9 according to the first embodiment.

In contrast, at step S202, when the control unit 55 determines that the smoothness determination index α associated with the obtained link data is not stored (step S202; No), the control unit 55 displays the guide image at the standard size, i.e., the display size corresponding to level 1 of the determination level Lv (step S208).

In this way, according to the third embodiment, the display system 100 can display the guide image at a proper display size in accordance with the vibration without using a vibration sensor.

MODIFICATIONS

Hereinafter, preferred modifications of the above-mentioned embodiments will be described below. Each modification mentioned later can be applied to the above-mentioned embodiments in combination.

First Modification

Regarding the first embodiment, the control unit 55 may determine the determination level Lv based on the vibration amount obtained from the vibration sensor 3 in the same way as the third embodiment. In this case, the control unit 55 stores in advance the upgrading threshold of the vibration amount for determining the upgrade of the determination level Lv to a target level and the downgrading threshold of the vibration amount for determining the downgrade of the determination level Lv from the target level to the next level. Then, as to the flowchart in FIG. 8, after obtaining the vibration amount from the vibration sensor 3 at step S101, the control unit 55 determines the determination level Lv by using the above-mentioned thresholds at step S105 based on the detected vibration amount without executing step S102 to step S104. Even according to this mode, the control unit 55 preferably lets the driver visually recognize the guide image regardless of the vibration amount of the vehicle Ve.

Second Modification

Regarding the second embodiment, the data storage unit 36 may store the determination level Lv associated with each road instead of or in addition to storing the smoothness determination index α associated with each road as the map data. In this case, the control unit 55 determines the display size of the guide image by obtaining the determination level Lv corresponding to the traveling road from the data storage unit 36. Even in this mode, the control unit 55 preferably lets the driver visually recognize the guide image regardless of the pavement condition of the traveling road.

Third Modification

Regarding the third embodiment, the control unit 55 may change the upgrading threshold and the downgrading threshold of the estimated vibration amount Ye depending on the road.

For example, in this case, with respect to each link data, the data storage unit 36 stores information on the above-mentioned thresholds in addition to the smoothness determination index α. Then, at the time of executing the flowchart in FIG. 12, the control unit 55 obtains the above-mentioned thresholds together with the smoothness determination index α from the link data at step S202, and performs the determination process of the determination level Lv at step S205.

In another example, with respect to each road type such as an ordinary road and a toll road, the data storage unit 36 stores information on the above-mentioned thresholds for determining the determination level Lv. Then, at the time of executing the flowchart in FIG. 12, the control unit 55 also recognizes the road type of the traveling road at step S205, and determines the determination level Lv with reference to the thresholds of the determination level Lv corresponding to the recognized road type.

Regarding the above-mentioned example, it is noted that the number of the stages of the determination level Lv may differ depending on the road. For example, the determination level Lv in the case of an ordinary road has two stages whereas the determination level Lv in the case of a highway has five stages.

In the same way, regarding the first and the second embodiments, the control unit 55 may change the upgrading thresholds and the downgrading thresholds of the smoothness determination index α depending on the road.

Fourth Modification

Regarding the first embodiment, if the speed average Xa is equal to or lower than a predetermined value (e.g., 5 km), the control unit 55 may set the determination level Lv to level 1 without calculating the smoothness determination index α. Thereby, the control unit 55 prevents the denominator of the equation (2) from being 0 and enables the smoothness determination index α to be calculated.

Fifth Modification

Regarding the first embodiment, the control unit 55 calculates the smoothness determination index α according to the equation (2). However, the calculation method of the smoothness determination index α to which the present invention can be applied is not limited to the calculation method. Instead, for example, in order to calculate the smoothness determination index α in which actual road surface conditions are more precisely reflected, the control unit 55 may calculate the smoothness determination index α by using more sophisticated equations or maps defined through experimental trials.

Sixth Modification

Regarding the first embodiment and the second embodiment, the control unit 55 changes the display size of the guide image in stages based on the determination level Lv. Instead, the control unit 55 may change the display size of the guide image in a continuous fashion in accordance with the smoothness determination index α. Namely, the larger the smoothness determination index α is, the larger the control unit 55 may continuously make the display size of the guide image. In the same way, regarding the third embodiment, on the basis of the determination level Lv, the control unit 55 may change the display size of the guide image in a continuous fashion in accordance with the estimated vibration amount Ye instead of changing the display size in stages.

Seventh Modification

According to FIG. 3, the head-up display 2 includes the combiner 9, and lets the driver see the virtual image Iv based on the light emitted from the light source unit 4 and reflected by the combiner 9. However, the configuration to which the present invention can be applied is not limited to the configuration. Instead, without the combiner 9, the head-up display 2 may let the driver see the virtual image Iv based on the light emitted from the light source unit 4 and reflected by the front window 25. In this case, the front window 25 is an example of "the display unit" according to the present invention.

In addition, the mounting position of the light source unit 4 is not limited to the ceiling board 27. Instead, the light source unit 4 may be provided on or inside the dashboard 29. When the light source unit 4 is provided on the dashboard 29, the combiner 9 is provided on the dashboard 29 or the front window 25 reflects the direct light from the light source unit 4 to let the driver recognize the virtual image Iv. When the light source unit 4 is provided inside the dashboard 29, the dashboard has an opening for letting the light pass into the combiner 9 or the front window 25.

The display system 100 may display the guide image overlapping the front scenery by using a wearable head-mounted display instead of displaying the guide image overlapping the front scenery by the head-up display 2.

Eighth Modification

The system controller 20 may perform a part of the process executed by the control unit 55. For example, the system controller 20 generates the guide image which the head-up display 2 displays and the light source unit 4 of the head-up display 2 receives the generated guide image. In this case, the system controller 20 determines the determination level Lv by executing the flowchart illustrated in FIG. 8 or FIG. 12, and provides the head-up display 2 with a signal which specifies the display size of the guide image or information needed for the light source 54 to emit the display light. In this modification, the system controller 20 functions as "the surface condition acquisition unit", "the display control unit", "the speed acquisition unit", "the vibration amount acquisition unit" and the computer which runs the program according to the present invention.

The head-up display 2 may have all or a part of the functions of the navigation device 1. In this case, for example, the light source unit 4 may include a memory on which the map data is stored and each sensor such as a GPS receiver.

Ninth Modification

In the case of the display example illustrated in FIG. 9, the control unit 55 does not change the display size of the speed display image 83. Instead, the control unit 55 may change the display size of all guide images including the speed display image 83 depending on the determination level Lv.

BRIEF DESCRIPTION OF REFERENCE NUMBERS

1 Navigation device
2 Head-up display
4 Light source unit
9 Combiner
25 Front window
28 Hood
29 Dashboard
100 Display system

The invention claimed is:

1. A display device comprising:
a display configured to display a first letter or a first graphic in a state that the first letter or the first graphic appears to overlap scenery visible from a vehicle;
a controller configured to control the display by determining information on a degree of smoothness of a road surface where the vehicle is traveling; and
one or more processors configured to obtain a traveling speed of the vehicle and a vibration amount of the vehicle,
wherein the controller is configured to determine the information on the degree of smoothness by calculating an average of the vibration amount divided by an average of the traveling speed and to change a first size of the first letter or the first graphic on the display in accordance with the determined information on the degree of smoothness.

2. The display device according to claim 1, wherein the controller is configured to display a first information and a second information at the same time on the display, the first information being indicated by the first letter or the first graphic where the first size associated with the first letter or the first graphic is changed by the controller, the second information being indicated by a second letter or a second graphic where a second size associated with the second letter or the second graphic is not changed by the controller.

3. The display device according to claim 2,
wherein the first information is route guide information.

4. The display device according to claim 2,
wherein the first information is an arrow image or a distance display image, the arrow image indicating a traveling direction at a route guide point.

5. The display device according to claim 2,
wherein the second information is a speed display image, the speed display image indicating the traveling speed of the vehicle.

6. The display device according to claim 2,
wherein the first information is an arrow image or a distance display image and the second information is a speed display image, the arrow image indicating a traveling direction at a route guide point, the speed display image indicating the traveling speed of the vehicle.

7. The display device according to claim 2, further comprising:
a storage configured to store first type information indicating a type of the first information and second type information indicating a type of the second information,
wherein the controller changes the first size of the first letter or the first graphic based on the first type information and/or the second size of the second letter or the second graphic based on the second type information.

8. The display device according to claim 1, wherein the first size of the first letter or the first graphic is increased in correlation to a decrease in the degree of smoothness of the road surface.

9. A control method executed by a display device, the method comprising:
displaying a letter or a graphic in a state that the letter or the graphic appears to overlap scenery visible from a vehicle;
controlling the display by determining information on a degree of smoothness of a road surface where the vehicle is traveling;
obtaining, by one or more processors, a traveling speed of the vehicle and a vibration amount of the vehicle; and
changing a size of the letter or the graphic on a display of the display device in accordance with the determined information on the degree of smoothness,
wherein the information on the degree of smoothness is determined by calculating an average of the vibration amount divided by an average of the traveling speed.

10. A non-transitory storage medium comprising a set of instructions which, when executed by a computer, causes the computer to execute a method comprising:
displaying a letter or a graphic in a state that the letter or the graphic appears to overlap scenery visible from a vehicle;
controlling the display by determining information on a degree of smoothness of a road surface where the vehicle is traveling;
obtaining a traveling speed of the vehicle and a vibration amount of the vehicle; and
changing a size of the letter or the graphic on a display of the display device in accordance with the determined information on the degree of smoothness,
wherein the information on the degree of smoothness is determined by calculating an average of the vibration amount divided by an average of the traveling speed.

11. A display device comprising:
a display configured to display a letter or a graphic in a state that the letter or the graphic appears to overlap scenery visible from a vehicle;
a controller configured to control the display by obtaining information on a degree of smoothness of a road surface where the vehicle is traveling; and
a processor configured to obtain a traveling speed of the vehicle,
wherein the controller obtains the information on the degree of smoothness of the road surface where the vehicle is traveling from map data in which information on a respective degree of smoothness per road is recorded and changes a size of the letter or the graphic on the display in accordance with an estimated vibration amount that is an index of the degree of smoothness multiplied by the traveling speed, the index being obtained from the map data.

* * * * *